(12) United States Patent
Van Brocklin et al.

(10) Patent No.: US 11,364,543 B2
(45) Date of Patent: Jun. 21, 2022

(54) THREE-DIMENSIONAL PRINTED COMPONENT SETTER GENERATION

(71) Applicant: HEWLETT-PACKARD DEVELOPMENT COMPANY, L.P., Spring, TX (US)

(72) Inventors: Andy Van Brocklin, Corvallis, OR (US); Jay Shields, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,767

(22) PCT Filed: Apr. 30, 2018

(86) PCT No.: PCT/US2018/030224
§ 371 (c)(1),
(2) Date: Oct. 24, 2019

(87) PCT Pub. No.: WO2019/212490
PCT Pub. Date: Nov. 7, 2019

(65) Prior Publication Data
US 2021/0331248 A1    Oct. 28, 2021

(51) Int. Cl.
*G05B 19/4099* (2006.01)
*B22F 10/85* (2021.01)
*B33Y 50/02* (2015.01)
*B28B 17/00* (2006.01)

(52) U.S. Cl.
CPC .......... *B22F 10/85* (2021.01); *B28B 17/0081* (2013.01); *B33Y 50/02* (2014.12); *G05B 19/4099* (2013.01); *G05B 2219/35134* (2013.01); *G05B 2219/49023* (2013.01)

(58) Field of Classification Search
None
See application file for complete search history.

(56) References Cited

U.S. PATENT DOCUMENTS

| | | | | |
|---|---|---|---|---|
| 5,503,785 A | * | 4/1996 | Crump | B33Y 40/00 264/40.7 |
| 6,596,224 B1 | | 7/2003 | Sachs et al. | |
| 9,815,118 B1 | | 11/2017 | Schmitt et al. | |
| 10,065,374 B2 | * | 9/2018 | Ho | G05B 17/02 |
| 10,520,923 B2 | * | 12/2019 | Connor | B33Y 50/02 |
| 2002/0171177 A1 | * | 11/2002 | Kritchman | B33Y 10/00 264/401 |
| 2010/0323301 A1 | | 12/2010 | Tang | |
| 2014/0333011 A1 | * | 11/2014 | Javidan | B29C 64/118 264/401 |

(Continued)

FOREIGN PATENT DOCUMENTS

KR     20170014619 A     2/2017

*Primary Examiner* — Jason Lin
(74) *Attorney, Agent, or Firm* — Mannava & Kang

(57) ABSTRACT

Three-dimensional (3D) printing may be described as an additive manufacturing process for generating 3D components. A 3D model may be used by a 3D printer to print the 3D component. In 3D printing, successive layers of material may be utilized to generate the 3D component. As part of the 3D printing process, the 3D component may be subjected to sintering. In some cases, the sintering may be accomplished by subjecting the 3D component to a heat source, or other types of processes.

15 Claims, 6 Drawing Sheets

(56) References Cited

U.S. PATENT DOCUMENTS

| | | | |
|---|---|---|---|
| 2015/0057784 A1* | 2/2015 | Butler | G06F 3/1262 |
| | | | 700/119 |
| 2015/0137423 A1* | 5/2015 | Ding | B29C 33/306 |
| | | | 264/308 |
| 2015/0218055 A1 | 8/2015 | McMillen et al. | |
| 2017/0173692 A1 | 6/2017 | Myerberg et al. | |
| 2017/0173877 A1 | 6/2017 | Myerberg et al. | |
| 2017/0232683 A1* | 8/2017 | Alcantara Marte | B29C 64/153 |
| | | | 264/497 |
| 2017/0297109 A1 | 10/2017 | Gibson et al. | |
| 2017/0372480 A1* | 12/2017 | Anand | G06T 19/20 |
| 2018/0001381 A1 | 1/2018 | Kimblad et al. | |

* cited by examiner

500

DETERMINE A SETTER HEIGHT DIMENSION FOR A SETTER THAT INCLUDES A DIGITAL SETTER AND AT LEAST ONE ANALOG SETTER TO SUPPORT A PORTION OF A THREE-DIMENSIONAL (3D) COMPONENT THAT IS TO BE SINTERED
502

DETERMINE, BASED ON THE SETTER HEIGHT DIMENSION, THE AT LEAST ONE ANALOG SETTER BY DETERMINING A BASE DIMENSION OF THE AT LEAST ONE ANALOG SETTER, AND DETERMINING, BASED ON THE BASE DIMENSION, A TOTAL NUMBER OF THE AT LEAST ONE ANALOG SETTER
504

DETERMINE, BY ANALYZING A TOTAL DIMENSION OF THE AT LEAST ONE ANALOG SETTER RELATIVE TO THE SETTER HEIGHT DIMENSION, A DIMENSION FOR THE DIGITAL SETTER TO SUPPORT, WHEN USED WITH THE AT LEAST ONE ANALOG SETTER, THE PORTION OF THE 3D COMPONENT
506

CAUSE, BASED ON THE DETERMINED DIMENSION FOR THE DIGITAL SETTER, THE DIGITAL SETTER TO BE GENERATED
508

FIG. 5

THREE-DIMENSIONAL PRINTED COMPONENT SETTER GENERATION

BACKGROUND

Three-dimensional (3D) printing may be described as an additive manufacturing process for generating 3D components. A 3D model may be used by a 3D printer to print the 3D component. In 3D printing, successive layers of material may be utilized to generate the 3D component. As part of the 3D printing process, the 3D component may be subjected to sintering. In some cases, the sintering may be accomplished by subjecting the 3D component to a heat source, or other types of processes.

BRIEF DESCRIPTION OF DRAWINGS

Features of the present disclosure are illustrated by way of example and not limited in the following figure(s), in which like numerals indicate like elements, in which:

FIG. 5 illustrates an example flowchart of a method for three-dimensional printed component setter generation.

DETAILED DESCRIPTION

Figure 1:
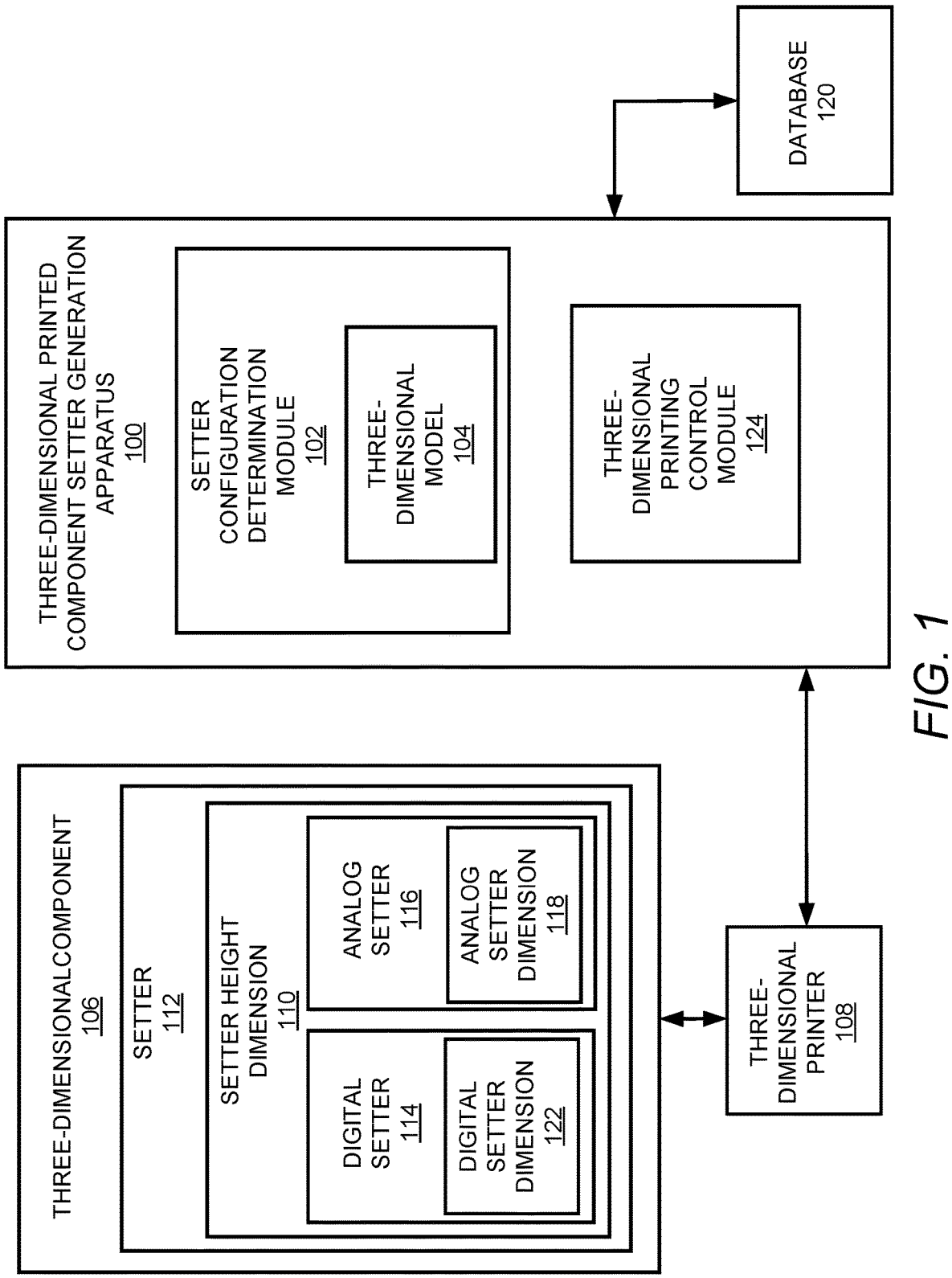
FIG. 1 illustrates an example layout of a three-dimensional printed component setter generation apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for three-dimensional printed component setter generation, methods for three-dimensional printed component setter generation, and non-transitory computer readable media having stored thereon machine readable instructions to provide three-dimensional printed component setter generation are disclosed herein. The apparatuses, methods, and non-transitory computer readable media disclosed herein provide for the formation of setters for sintering three-dimensional (3D) components in a manner that may reduce the amount of material that needs to be printed for the setters. The 3D components may include, for example, 3D printed metal parts. The reduction in the amount of material needed may reduce costs associated with a 3D print. The setters may be formed using a digital setter, and an analog setter or a plurality of analog setters. According to examples described herein, the analog setter may include pre-existing "stock" setters that may be coupled with the digital setter to provide a customized setter with minimal 3D print material usage.

With respect to 3D printed components, manufacturing of such components may be performed using, for example, 3D binder jet class metal or ceramic printer family of technologies. The 3D binder jet technology may include 3D printing technologies that print a binder material to hold particles together so as to define the 3D component to be printed. The binder material may include, for example, dissolved polymeric material, dispersed polymeric material, metal nanoparticles, curable monomer/oligomers, etc. The binder material may be deposited as droplets or a stream in a liquid vehicle in a desired pattern using, for example, liquid jetting technology. The binder may define the geometry of the 3D component that is being printed by holding powder bed particles together, as metal particles without the binder may not be retained as the 3D component is removed from a powder bed. Binder jet metal printer technologies may utilize green (e.g., not yet sintered, not yet post processed) components that are removed from the powder bed, and processed in a subsequent sintering step, for example, in an oven.

During the post-printing sintering process, some sections of the binder jet green structure, for example those that are not directly supported by the oven base, may need to be supported in some manner. If unsupported, these sections of the 3D component may soften sufficiently to deform during sintering. This unintended deformation may be undesirable because it may render the final finished 3D component as an out of tolerance form or otherwise unusable. In other 3D printing techniques such as fused deposition modelling, printing of green components may also need supports (i.e., setters as disclosed herein) to be printed with the green component.

With respect to binder jet printing, binder jet printed setters may vary in location and geometry depending on the desired form of the 3D component that is to be printed. The setter geometry may be generated automatically or semi-automatically by design software, and may conform to the portion of the desired component geometry that is being supported. Ceramic setters may be utilized for many binder jet printed components. In some cases, printed setters may be utilized for short runs or complex geometries. In some cases, ceramic setters may be most cost effective for certain geometries and longer runs. Both powder bed and fused deposition modelling printed metal components may need to undergo sintering to become finished components. 3D components generated by some of these techniques may need unique and component geometry dependent setters to be created in-place during the printing process, for example for short runs or relatively complex geometries. In this regard, the setters may not be part of the final finished component, and may need to be removed, for example, after completion of sintering. Hence, the cost of printing the setters adds to the cost of printing of a 3D component.

In some cases, metal printers may be used to create setters with an interface region of reduced material density, points, or relatively small rods between the setter itself and the form of the 3D component to be printed. For fused deposition modelling, binder jet technology, and other such manufacturing techniques, these setters may perform a mechanical function of supporting the form to be printed during sintering. The area of reduced material density with respect to the interface region may include a breakaway function.

The setters that are printed may utilize relatively significant and costly printing material as the setters, in binder jet systems for example, may be formed of the same powdered build material as used for generating the 3D component. These setters, may, in some cases, utilize more material than the 3D component itself. For many alloys, this may represent a significant expense. For example, 17-4PH stainless powder suitable for use with 3D printing may be a significant portion (e.g., 20-30%) of the print cost in print cases. This setter material cost may be a relatively significant expense of each 3D metal or ceramic print. Moreover, printing of such setters may add technical challenges with respect to the design and inclusion of such setters, as well as removal of the setters after sintering. In this regard, it is technically challenging to reduce the utilization of such setters, which are needed to prevent 3D component deformation during sintering.

The apparatuses, methods, and non-transitory computer readable media disclosed herein address at least the aforementioned technical challenges by determining a support structure, describe hereinafter as a setter, which may be formed of both a digital setter, and an analog setter or a plurality of analog setters. A 'digital setter' may be described as a setter that is formed by the printer as the 3D component is being generated, whereas an 'analog setter' may be described as a preformed setter. In this regard, a 3D model of a 3D component that is to be printed by a 3D printer may be used to determine a setter height dimension for the setter that is to support a portion of the 3D component during a post-printing sintering operation. Based on the setter height dimension, an analog setter dimension of the analog setter (or the plurality of analog setters) may be determined. A digital setter dimension for the digital setter may be determined by analyzing the analog setter dimension relative to the setter height dimension. Based on the determined digital setter dimension, the digital setter may be caused to be printed during printing of the 3D component.

According to examples described herein, the apparatuses, methods, and non-transitory computer readable media disclosed herein may utilize preformed analog setters to support a powder metal part during sintering, combined with digitally printed setters. This combination may reduce the amount of powder build material consumed to create 3D printed components, which may include both metal and ceramic 3D printed components.

According to examples described herein, the apparatuses, methods, and non-transitory computer readable media disclosed herein may utilize a set of analog (e.g., pre-designed) setters of various fixed geometries. The apparatuses, methods, and non-transitory computer readable media disclosed herein may provide for the automatic selection of setters as needed for a particular 3D component design, for example, from an inventory of existing 3D components, an inventory of digital setters, and/or an inventory of existing analog setters. The existing setter geometries may be incorporated using digitally printed interfaces between the 3D component and the digital setter. The digital setters may be printed using the same build powder as the 3D component, designed with the 3D component, and may then be printed digitally in the 3D printer closely coupled with the 3D component, with, in some examples, a breakaway interface incorporated between the 3D component and the digital setter.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a three-dimensional printed component setter generation apparatus (hereinafter also referred to as "apparatus 100").

Referring to FIG. 1, the apparatus 100 may include a setter configuration determination module 102 to determine, from a 3D model 104 of a 3D component 106 that is to be printed by a 3D printer 108, a setter height dimension 110 for a setter 112 that is to support a portion of the 3D component 106 during a post-printing sintering operation. The setter 112 may include a digital setter 114 and an analog setter 116 (or a plurality of analog setters).

The setter configuration determination module 102 may determine, based on the setter height dimension 110, an analog setter dimension 118 of the analog setter 116 (or a plurality of analog setters). Dimensions and configurations of available analog setters may be provided in a database 120, which may thus contain an inventory of available analog setters. The database 120 may further include an inventory of existing 3D components, and an inventory of digital setters that may be used with the existing 3D components. This inventory in the database 120 may be used for the selection of digital and/or analog setters for a particular 3D component 106 that is to be printed. The 3D component 106 may also be analyzed to determine where a setter is needed, and then to determine the shortest digital setter that may be used with a preformed analog setter.

According to examples described herein, when a plurality of analog setters are used, the setter configuration determination module 102 may determine, based on the setter height dimension 110, the analog setter dimension 118 of a plurality of analog setters by determining a base dimension of the analog setters. Further, the setter configuration determination module 102 may determine a total number of the analog setters by dividing the setter height dimension 110 by the base dimension of the analog setters. Further, the setter configuration determination module 102 may convert the total number of the analog setters to a binary sequence. In this regard, the setter configuration determination module 102 may utilize each number in the binary sequence to ascertain the analog setters to support the portion of the 3D component 106.

The setter configuration determination module 102 may determine, by analyzing the analog setter dimension 118 relative to the setter height dimension 110, a digital setter dimension 122 for the digital setter 114.

A 3D printing control module 124 may cause, based on the determined digital setter dimension 122, the digital setter 114 to be printed during printing of the 3D component 106.

According to examples described herein, the digital setter 114 may be formed of metal. Alternatively or additionally, the digital setter 114 may be formed of ceramic. Similarly, the digital setter 114 may be formed of other materials that may be used to support a portion of the 3D component 106. According to examples described herein, the digital setter 114 may be formed of the same material as the component 106 in a binder jet system, and of different materials from different extrusion heads for fused deposition modeling systems.

According to examples described herein, the 3D printing control module 124 may cause, based on the determined digital setter dimension 122, the digital setter 114 to be printed during printing of the 3D component 106 by determining a configuration of the portion of the 3D component 106 that is to be supported during a sintering phase by the digital setter 114 and the analog setter 116. Further, the 3D printing control module 124 may cause, based on the determined configuration, the digital setter 114 to be printed to include a configuration corresponding to the configuration of the portion of the 3D component 106.

Operation of the modules and other elements of the apparatus 100 is described in further detail with reference to FIGS. 1-3.

Figure 2:
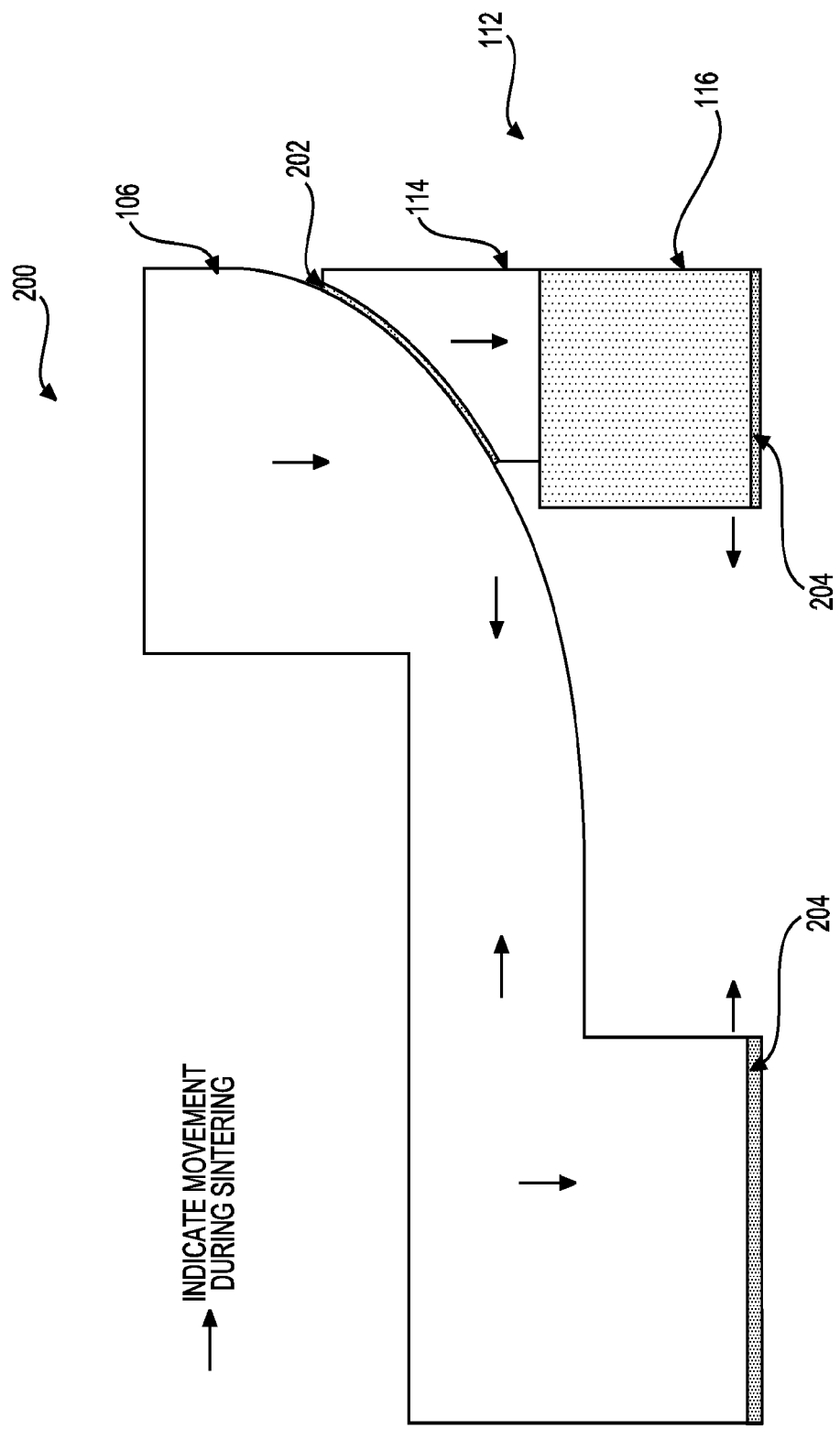
FIG. 2 illustrates an example layout of a digital setter and an analog setter to illustrate operation of the apparatus of FIG. 1.

FIG. 2 illustrates an example layout 200 of a digital setter 114 and an analog setter 116 to illustrate operation of the apparatus 100.

Referring to FIG. 2, the layout 200 illustrates an example of a 3D component 106 including a setter 112 including a digital setter 114 and an analog setter 116, as this assembly would be used in a sintering oven. The example of FIG. 2 shows the 3D component 106 including the setter 112 placed into a sintering oven, on a tray or oven floor designed to withstand the temperatures used in sintering the 3D component 106. For the sintering process of the 3D component 106, an automated system (not shown) may place the analog setter 116 first, according to geometry requests passed from the design tools through the database 120. Thereafter, that 3D component 106 including the digital setter 114 may be placed in contiguous engagement with the analog setter 116.

With respect to breakaway interface layer 202, the setter configuration determination module 102 may generate a configuration of the digital setter 114 to include the breakaway interface layer 202. In this regard, the breakaway interface layer 202 may include an interface region of reduced material density, points, or relatively small rods between the digital setter 114 and the form of the 3D component 106 to be printed. The area of reduced material density with respect to the interface region may include a breakaway function to facilitate removal of the digital setter 114 after completion of sintering of the 3D component 106. According to examples described herein, the breakaway interface layer 202 may be formed of cementite ($Fe_3C$) to create the desired brittle junction between the 3D component 106 being printed, and the digital setter 114. The cementite ($Fe_3C$) layer may be formed when elemental Carbon mixes with Iron during sintering. In some examples, the composition of the breakaway interface layer 202 is 6.67 wt % C and 93.33 wt % Fe. In other examples, the breakaway interface layer 202 may be formed of ferrosilicon (FeSi), Chromium Carbide ($Cr_3C_2$, $Cr_7C_3$, and $Cr_{23}C_6$), or other such materials.

At 204, powder may be placed at a bottom of the 3D component 106 to provide for low friction movement of the 3D component 106 as the 3D component 106 shrinks. For example, the powder at 204 may reduce friction between the setter bottom and an oven surface. The powder at 204 may be spherical, or another shape. In this regard, other materials may be utilized to facilitate low friction movement of the 3D component 106 as the 3D component 106 shrinks.

Figure 3:
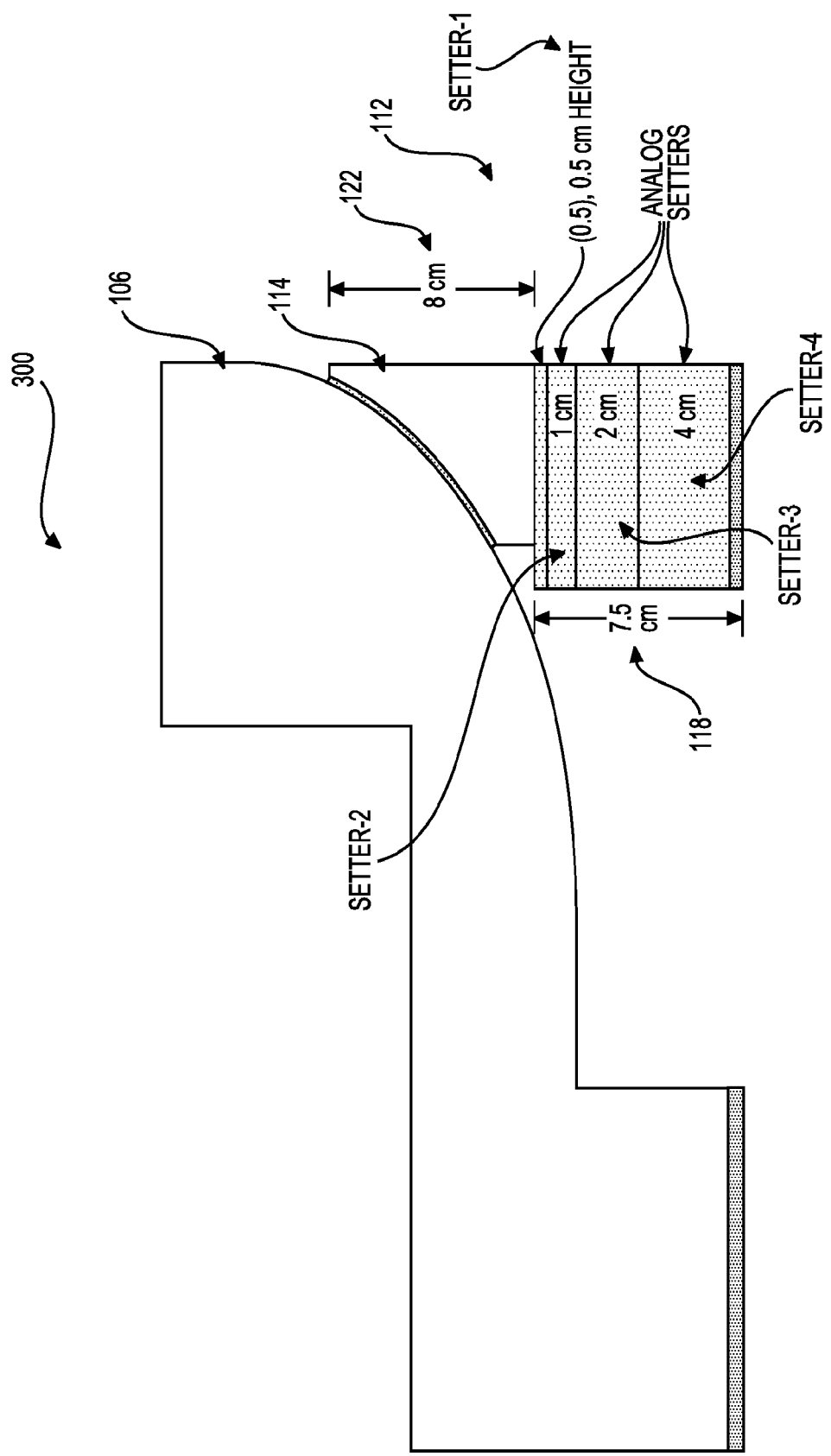
FIG. 3 illustrates an example layout of a digital setter and a plurality of analog setters to illustrate operation of the apparatus of FIG. 1.

FIG. 3 illustrates an example layout 300 of a digital setter 114 and a plurality of analog setters to illustrate operation of the apparatus 100.

Referring to FIG. 3, the layout 300 may illustrate how multiple analog setters may be stacked to provide geometries as needed. For the example of FIG. 3, the digital setter dimension 122 (e.g., largest height extent) of the digital setter 112 may be 8 cm, of a total setter height dimension 110 of 15.5 cm needed (e.g., 8 cm+7.5 cm=15.5 cm). The remaining portion of the desired height (e.g., analog setter dimension 118) may be provided by the combination of four analog setters stacked on each other (e.g., setter-1 of 0.5 cm height, setter-2 of 1.0 cm height, setter-3 of 2 cm height, and setter-4 of 4 cm height). The analog setters may be approximately 9 cm in width in this example. This width dimension may vary depending on the dimensions of the 3D component 106. According to examples disclosed herein, the width of the analog setters may be greater than the width of the digital setter 114 to facilitate placement of the digital setter 114 onto the analog setters, and to provide uniform support for the digital setter 114. However, if needed, the width of the digital setter 114 may be wider than the width of the analog setter 116.

As disclosed herein, when a plurality of analog setters are used, the setter configuration determination module 102 may determine, based on the setter height dimension 110, the analog setter dimension 118 of a plurality of analog setters by determining a base dimension of the analog setters. Further, the setter configuration determination module 102 may determine a total number of the analog setters by dividing the setter height dimension 110 by the base dimension of the analog setters. Further, the setter configuration determination module 102 may convert the total number of the analog setters to a binary sequence. In this regard, the setter configuration determination module 102 may utilize each number in the binary sequence to ascertain the analog setters to support the portion of the 3D component 106.

For the example of FIG. 3, with a desired analog setter height of 7.5 cm and a base dimension of the analog setters of 0.5 cm, the setter configuration determination module 102 may determine a total number of the analog setters by dividing the setter height dimension 110 by the base dimension of the analog setters to determine the total number of the base dimensional units as 15. The number 15 may then be converted into binary, as 1111. The setter configuration determination module 102 may utilize each number in the binary sequence to select an analog setter, with the least significant digit, for example, if a "1" is being used to select the smallest incremental height that may be utilized. In this example, the least significant digit may be used to select a 0.5 cm thick analog setter (e.g., setter-1), the next digit may be used to select a 1 cm thick setter (e.g., setter-2), and so forth. This provides, in this example, a 7.5 cm analog setter dimension 118 for the analog setters.

According to another example, the shortest possible digital setter that may be used with a known set of available analog setters may be determined. In this regard, dimensions of the shortest possible digital setter may be determined, for example, to minimize the amount of build material needed to form the digital setter.

According to another example, if a 5 cm analog setter dimension 118 is needed for the analog setters, for the example of FIG. 3, the binary number would be 1010 (e.g., (5 cm)/(0.5 base dimension of the analog setters)=10, which converted to binary is 1010). In this case, a 1 cm and 4 cm height analog setters may be selected, providing the desired analog setter dimension 118 for the analog setters.

With respect to stacking and placement of analog setters, as disclosed herein, the analog setters may be stacked and/or placed adjacent to each other to obtain a specified geometry.

In this regard, an inventory of analog setters may be created, where analog setter height dimensions may be specified as powers of two. For example, a plurality of analog setters with a 1 cm×1 cm XY footprint may be created in thicknesses of 0.5 cm, 1 cm, 2 cm, 4 cm, 8 cm, etc. In this regard, to create a 6.5 cm analog setter, a 4 cm, 2 cm, and 0.5 cm setter may be stacked.

According to examples described herein, the choice of which analog setters to stack may be determined by the setter configuration determination module 102 by a binary conversion process. For example, the desired setter height dimension 110, which includes the digital setter dimension 122 and the analog setter dimension 118, may be divided by the minimum binary setter size (e.g., the base dimension of the analog setters). This would provide a number of minimum setter size increments and a remainder value. The number of minimum setter thicknesses may be converted into binary, and used to select the 1×, 2×, 4×, etc., thicknesses of analog setters. The remainder may be provided to the setter configuration determination module 102 to design the digital setter 114.

According to examples described herein, the setter configuration determination module 102 may determine the number of setters of various sizes that may be needed to print the 3D component 106. This determined number may be reconciled against the number of available analog setters in a manufacturing environment, to provide feedback for printing the 3D component 106.

Figure 4:
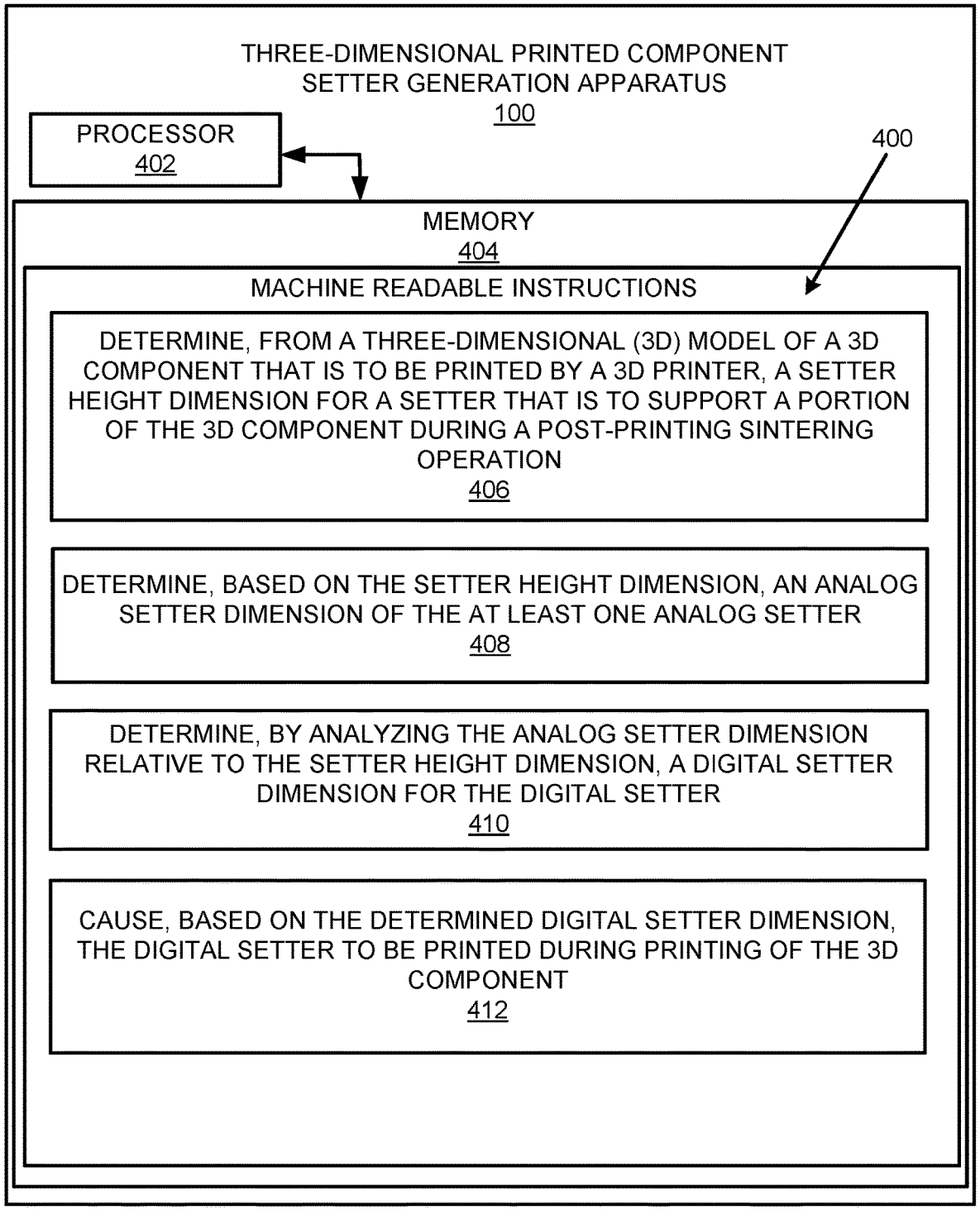
FIG. 4 illustrates an example block diagram for three-dimensional printed component setter generation.
Figure 6:
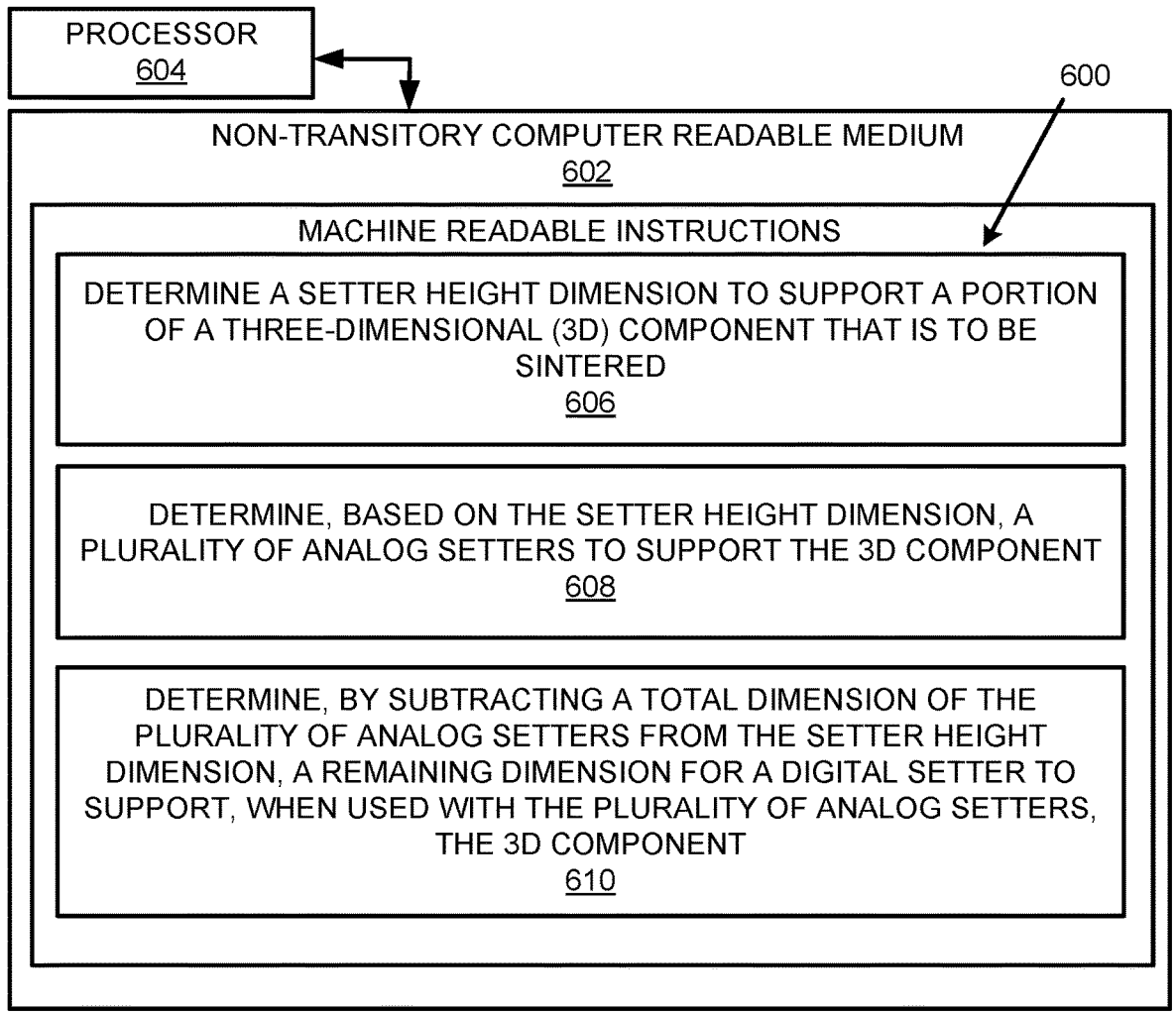
FIG. 6 illustrates a further example block diagram for three-dimensional printed component setter generation.

FIGS. 4-6 respectively illustrate an example block diagram 400, an example flowchart of a method 500, and a further example block diagram 600 for three-dimensional printed component setter generation. The block diagram 400, the method 500, and the block diagram 600 may be implemented on the apparatus 100 described above with reference to FIG. 1 by way of example and not limitation. The block diagram 400, the method 500, and the block diagram 600 may be practiced in other apparatus. In addition to showing the block diagram 400, FIG. 4 shows hardware of the apparatus 100 that may execute the instructions of the block diagram 400. The hardware may include a processor 402, and a memory 404 (i.e., a non-transitory computer readable medium) storing machine readable instructions that when executed by the processor 402 cause the processor to perform the instructions of the block diagram 400. The memory 404 may represent a non-transitory computer readable medium. FIG. 5 may represent a method for three-dimensional printed component setter generation. FIG. 6 may represent a non-transitory computer readable medium 602 having stored thereon machine readable instructions to provide three-dimensional printed component setter generation. The machine readable instructions, when executed, cause a processor 604 to perform the instructions of the block diagram 600 also shown in FIG. 6.

The processor 402 of FIG. 4 and/or the processor 604 of FIG. 6 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 602 of FIG. 6), such as hardware storage devices (e.g., RAM (random access memory), ROM (read only memory), EPROM (erasable, programmable ROM), EEPROM (electrically erasable, programmable ROM), hard drives, and flash memory). The memory 404 may include a RAM, where the machine readable instructions and data for a processor may reside during runtime.

Referring to FIGS. 1-4, and particularly to the block diagram 400 shown in FIG. 4, the memory 404 may include instructions 406 to determine, from a 3D model 104 of a 3D component 106 that is to be printed by a 3D printer 108, a setter height dimension 110 for a setter 112 that is to support a portion of the 3D component 106 during a post-printing sintering operation. The setter 112 may include a digital setter 114 and at least one analog setter 116.

The processor 402 may fetch, decode, and execute the instructions 408 to determine, based on the setter height dimension 110, an analog setter dimension 118 of the at least one analog setter 116.

The processor 402 may fetch, decode, and execute the instructions 410 to determine, by analyzing the analog setter dimension 118 relative to the setter height dimension 110, a digital setter dimension 122 for the digital setter 114.

The processor 402 may fetch, decode, and execute the instructions 412 to cause, based on the determined digital setter dimension 122, the digital setter 114 to be printed during printing of the 3D component 106.

Referring to FIGS. 1-3 and 5, and particularly FIG. 5, for the method 500, at block 502, the method may include determining a setter height dimension 110 for a setter 112 that includes a digital setter 114 and at least one analog setter 116 to support a portion of a 3D component 106 that is to be sintered.

At block 504, the method may include determining, based on the setter height dimension 110, the at least one analog setter 116 by determining a base dimension of the at least one analog setter 116, and determining, based on the base dimension, a total number of the at least one analog setter 116.

At block 506, the method may include determining, by analyzing a total dimension of the at least one analog setter 116 relative to the setter height dimension 110, a dimension for the digital setter 114 to support, when used with the at least one analog setter 116, the portion of the 3D component 106.

At block 508, the method may include causing, based on the determined dimension for the digital setter 114, the digital setter 114 to be generated.

Referring to FIGS. 1-3 and 6, and particularly FIG. 6, for the block diagram 600, the non-transitory computer readable medium 602 may include instructions 606 to determine a setter height dimension 110 to support a portion of a 3D component 106 that is to be sintered.

The processor 604 may fetch, decode, and execute the instructions 608 to determine, based on the setter height dimension 110, a plurality of analog setters to support the 3D component 106.

The processor 604 may fetch, decode, and execute the instructions 610 to determine, by subtracting a total dimension of the plurality of analog setters from the setter height dimension 110, a remaining dimension for a digital setter 114 to support, when used with the plurality of analog setters, the 3D component 106.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
   determine, from a three-dimensional (3D) model of a 3D component that is to be printed by a 3D printer, a setter height dimension for a setter that is to support a portion of the 3D component during a post-printing sintering operation, wherein the setter includes a digital setter and at least one analog setter, and wherein the digital setter is a setter to be printed during printing of the 3D component, and the at least one analog setter is a preformed setter;
   determine, based on the setter height dimension, an analog setter dimension of the at least one analog setter, including causing the processor to:
      determine a base dimension of the at least one analog setter; and
      determine a total number of the at least one analog setter by dividing the setter height dimension by the base dimension of the at least one analog setter;
   determine, by analyzing the analog setter dimension relative to the setter height dimension, a digital setter dimension for the digital setter; and
   cause, based on the determined digital setter dimension, the digital setter to be printed.

2. The apparatus according to claim 1, wherein the digital setter is formed of a same build material as the 3D component.

3. The apparatus according to claim 1, wherein the instructions to determine, based on the setter height dimension, the analog setter dimension of the at least one analog setter are further to cause the processor to:
   determine, based on a set of available analog setters, the analog setter dimension of the at least one analog setter.

4. The apparatus according to claim 1, wherein the instructions to determine the digital setter dimension for the digital setter are further to cause the processor to:
   subtract the analog setter dimension of the at least one analog setter from the setter height dimension to determine the digital setter dimension for the digital setter.

5. The apparatus according to claim 1, wherein the instructions to determine, based on the setter height dimension, the analog setter dimension of the at least one analog setter are further to cause the processor to:
   convert the total number of the at least one analog setter to a binary sequence; and
   utilize each number in the binary sequence to ascertain the at least one analog setter to support the portion of the 3D component.

6. The apparatus according to claim 1, wherein the instructions to cause, based on the determined digital setter dimension, the digital setter to be printed are further to cause the processor to:
   determine a configuration of the portion of the 3D component that is to be supported by the digital setter and the at least one analog setter, and
   cause the digital setter to be printed to include a configuration corresponding to the determined configuration of the portion of the 3D component.

7. A computer implemented method comprising:
determining, by a processor, a setter height dimension for a setter that includes a digital setter and at least one analog setter to support a portion of a three-dimensional (3D) component that is to be sintered, wherein the digital setter is a setter to be generated during printing of the 3D component, and the at least one analog setter is a preformed setter;
determining, by the processor, based on the setter height dimension, an analog setter dimension of the at least one analog setter by
   determining a base dimension of the at least one analog setter, and
   determining a total number of the at least one analog setter by dividing the setter height dimension by the base dimension of the at least one analog setter;
determining, by the processor, by analyzing the analog setter dimension of the at least one analog setter relative to the setter height dimension, a dimension for the digital setter to support, when used with the at least one analog setter, the portion of the 3D component; and
causing, by the processor, based on the determined dimension for the digital setter, the digital setter to be generated.

8. The method according to claim 7, wherein determining, by analyzing the analog setter dimension of the at least one analog setter relative to the setter height dimension, the dimension for the digital setter to support, when used with the at least one analog setter, the portion of the 3D component further comprises:
   determining, by subtracting the analog setter dimension of the at least one analog setter from the setter height dimension, the dimension for the digital setter to support, when used with the at least one analog setter, the portion of the 3D component.

9. The method according to claim 7, wherein causing, based on the determined dimension for the digital setter, the digital setter to be generated further comprises:
   causing, based on the determined dimension for the digital setter, the digital setter to be printed during the printing of the 3D component.

10. The method according to claim 7, wherein determining, based on the setter height dimension, the at least one analog setter further comprises:
   converting the total number of the at least one analog setter to a binary sequence; and
   utilizing each number in the binary sequence to ascertain the at least one analog setter.

11. The method according to claim 7, further comprising:
   forming the digital setter of a same build material as the 3D component.

12. The method according to claim 7, wherein causing the digital setter to be generated comprises:
   determining a configuration of the portion of the 3D component that is to be supported by the digital setter and the at least one analog setter, and
   causing the digital setter to be printed to include a configuration corresponding to the determined configuration of the portion of the 3D component.

13. A non-transitory computer readable medium having stored thereon machine readable instructions, the machine readable instructions, when executed, cause a processor to:
   determine a setter height dimension for a setter that includes a digital setter and at least one analog setter to support a portion of a three-dimensional (3D) component that is to be sintered, wherein the digital setter is a setter to be printed during printing of the 3D component, and the at least one analog setter is a preformed setter;

determine, based on the setter height dimension, an analog setter dimension of the at least one analog setter, including causing the processor to:
  determine a base dimension of the at least one analog setter; and
  determine a total number of the at least one analog setter by dividing the setter height dimension by the base dimension of the at least one analog setter;
determine, by analyzing the analog setter dimension relative to the setter height dimension, a digital setter dimension for the digital setter; and
cause, based on the determined digital setter dimension, the digital setter to be printed.

14. The non-transitory computer readable medium according to claim 13, wherein the machine readable instructions to determine the digital setter dimension for the digital setter, when executed, further cause the processor to:
  subtract the analog setter dimension of the at least one analog setter from the setter height dimension to determine the digital setter dimension for the digital setter.

15. The non-transitory computer readable medium according to claim 13, wherein the machine readable instructions to determine, based on the setter height dimension, the analog setter dimension of the at least one analog setter, when executed, further cause the processor to:
  convert the total number of the at least one analog setter to a binary sequence; and
  utilize each number in the binary sequence to ascertain the at least one analog setter to support the portion of the 3D component.

* * * * *